United States Patent [19]

Woelfl et al.

[11] Patent Number: 5,235,153

[45] Date of Patent: Aug. 10, 1993

[54] METHOD OF MAKING A MINIATURE LENS FOR USE WITH AN OPTICAL FIBER

[75] Inventors: Rudolph Woelfl, Malibu; Alexander Wasserman, West Hills, both of Calif.; Terrance W. Allsworth, Ottawa Hills, Ohio

[73] Assignee: G & H Technology, Inc., Camarillo, Calif.

[21] Appl. No.: 793,125

[22] Filed: Nov. 18, 1991

[51] Int. Cl.⁵ ............................................. B23K 26/00
[52] U.S. Cl. ............................ 219/121.66; 219/121.65
[58] Field of Search ...................... 219/121.19, 121.20, 219/121.65, 121.66, 121.82, 121.83

[56] References Cited

U.S. PATENT DOCUMENTS 4,455,893  6/1984  Astero .................... 219/121.65 X

*Primary Examiner*—C. L. Albritton
*Attorney, Agent, or Firm*—George J. Netter

[57] ABSTRACT

A cylindrical glass blank (10) has one end received within a rotatable fixture (22) supporting the blank with its axis extending vertically. While rotating the fixture and glass blank at a given rate, a laser beam (54) is directed onto the upper blank end face (12) until the glass softens. The combination of the glass softening, glass surface tension and centrifugal force experienced from the rotation, the glass bank is formed into a convex lens (20).

7 Claims, 2 Drawing Sheets

METHOD OF MAKING A MINIATURE LENS FOR USE WITH AN OPTICAL FIBER

BACKGROUND

1. Field of the Invention

The present invention relates generally to a method of making a lens, and, more particularly, to such a method for making a miniature lens to be used in a terminus to transmit optical signals from the end of one fiber to another, for example.

2. Description of Related Art

There are many situations in which a miniature lens is required. For example, in providing interconnections between broken optical fibers used to transmit a light signal or between two separate optical fibers via which it is desired to transmit an optical signal, two faced-off fiber ends are received within a securing apparatus referred to as a terminus with a lens between the two faced-off fiber ends which serves to receive light signals coming from one fiber and concentrate them on the face of the second fiber, thereby enhancing light transmission efficiency. Such lenses can be either spherical, hemispherical or aspherical. The dimensions of such lenses are relatively small in the range of perhaps as small as 0.020 inches and in the past they have been manufactured by conventional grinding and polishing techniques which are time consuming and relatively expensive.

There are also, in addition to glass or quartz ground and polished lenses, plastic molded lenses which have not been found fully satisfactory from an optical and environmental standpoint, although they can be readily molded in even miniature sizes.

It would, therefore, be highly advantageous to be able to produce glass (i.e., quartz, silica) lenses selectively having either spherical surfaces or aspherical surfaces and possessing the overall relatively miniature dimensions required for use in such contexts as an optical fiber terminus, and not have to employ conventional grinding and polishing techniques.

SUMMARY OF THE DISCLOSURE

In accordance with the lens making method of the present invention, a cylindrical blank of glass has one end received within a rotatable fixture and oriented with its longitudinal axis vertically oriented. While rotating the glass blank about its cylindrical axis at a predetermined rate, a laser beam is focused on the blank upper exposed end surface which acts to soften the blank material and convert the blank end from a flat surface into a convexly curving surface suitable for use as a lens. The curvature of the lens formed on the end portion of the glass blank is determined by the rate of blank rotation (e.g., the centrifugal force achieved), the power of the laser beam, and the length of time that the laser beam is directed onto the glass blank. By varying one or more of these factors, the lens surface can be formed to either a spherical curve or an aspherical curve, as desired.

Aligning of the laser beam onto the end of the glass blank in preparation for lens formation according to the present invention, as well as monitoring formation of the lens, can be optionally accomplished either by a video system or visual examination achieved with a microscope.

DESCRIPTION OF A PREFERRED EMBODIMENT

Figure 1:
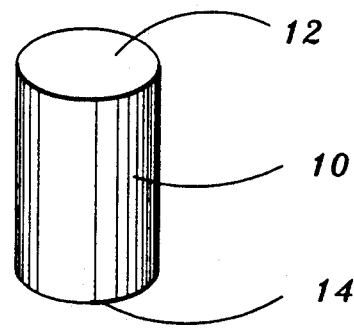
FIG. 1 is a perspective view of a glass blank to be made into a lens in accordance with the present invention.
Figure 2:
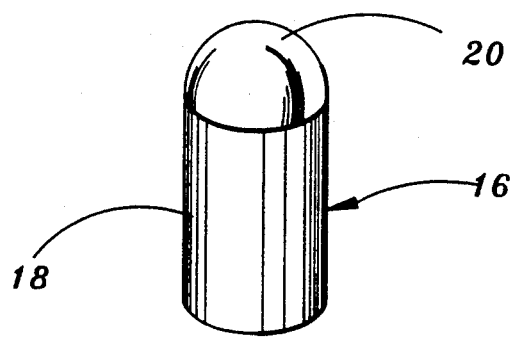
FIG. 2 is a perspective view of the glass blank of FIG. 1 after it has been formed into a lens.

Turning now to the drawings and particularly FIGS. 1 and 2, there is shown a cylindrical glass or quartz blank 10, having opposite end faces 12 and 14 which are faced off at precisely ninety degrees to the cylindrical axis of the blank 10. It is this blank that serves as the basic workpiece from which a final lens 16 is produced by the method of the present invention which consists generally of an unchanged shank portion 18 and one end face of which has been conformed into a lens portion 20 with a convexly curved outer surface generally symmetrical about the glass blank cylindrical axis. As will be more particularly described, the curved lens portion 20 can be made either spherical or aspherical, as desired. Moreover, although a lens is only shown as provided on one end of the glass blank, the described method can be utilized to provide a lens on both ends of the blank of identical or differing curvature.

As already discussed, the lens 16 is of miniature dimensions typically not more than 0.020–0.050 inches in diameter and having a length of several times the diameter when used in an optical fiber terminus. It is considered an advantageous aspect of this invention to enable the construction of a lens of this relative small size without having to resort to the relatively more difficult and expensive known lens fabricating techniques involving grinding and polishing.

Figure 5:
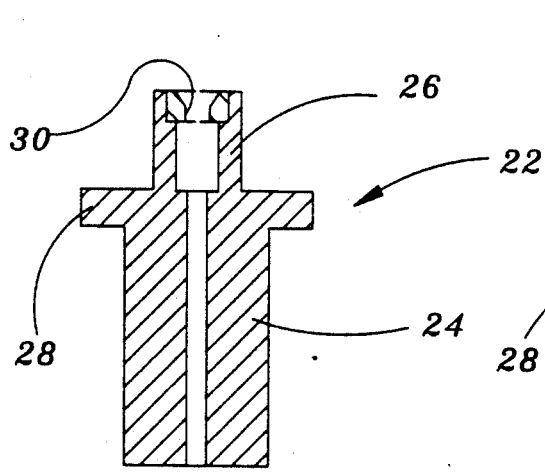
FIG. 5 is a sectional elevational view taken along the line 5—5 of FIG. 4.
Figure 4:
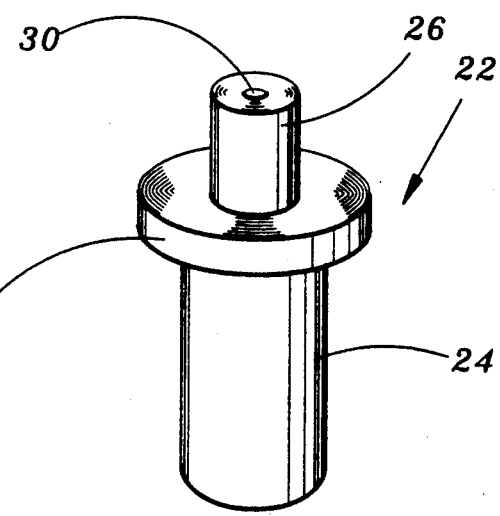
FIG. 4 is a perspective view of a holding fixture for the glass blank.
Figure 3:
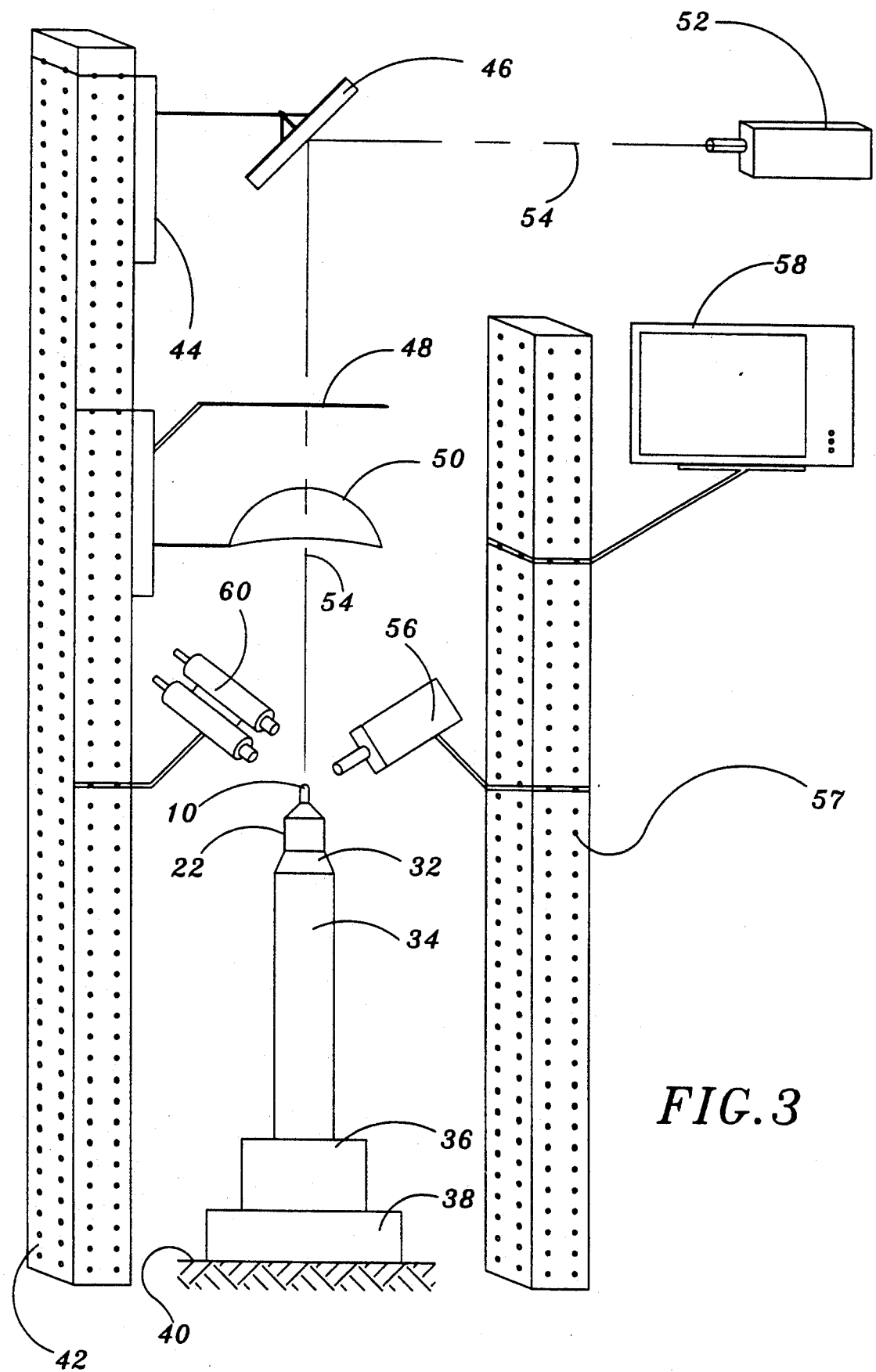
FIG. 3 is a side elevational, partially schematic view of apparatus for practicing the method of this invention.

For the ensuing detailed description of the apparatus for accomplishing the method of this invention, reference is now made particularly to FIG. 3. While being acted upon in a way to be described to produce a lens, the blank 10 is held in a vertically upright position with its cylindrical axis precisely vertically aligned with that of a holding fixture 22. This fixture, the details of which are best seen in FIGS. 4 and 5, includes a cylindrical shank portion 24 that is unitary with a smaller diameter cylindrical portion 26 concentric therewith and the two cylindrical portions being separated from one another by an enlarged radial extending flange 28. An axial opening 30 has a diameter enabling fitting receipt of the glass blank therewithin positioning the blank precisely along the axis of the holding fixture.

Although other mounting arrangements for the holding fixture may be found advantageous, in a practical construction of the invention, the holding fixture is received within a collet 32 secured to the upper end of a rotatable air spindle 34 which is, in turn, secured to the upper surface of a mounting bracket 36, and with all of the apparatus just described being fixedly mounted onto an X-Y stage 38. It is also preferable that the X-Y stage be located on a horizontal surface 40.

As will be more particularly described, the X-Y stage enables the necessary precise locating of the holding fixture 22 and glass blank 10 received therein in a particular location with respect to the lens forming apparatus to be described at this time. The air spindle 34, which is of conventional construction, is interconnected with a rotative power source (not shown) to rotate the glass blank about its cylindrical axis (arrow) at a speed and for a purpose which will be set forth later herein. The collet 32, air spindle 34, mounting bracket 36 and X-Y stage 38 are all of well known construction and operation, and for that reason further detailed description of these items will not be given.

Adjacent the glass blank 10 supported within the holding fixture 22, there is located a vertical optical bench 42 which may also be mounted on the horizontal surface 40. At a convenient upper location on the optical bench there is secured an adjustable X-Y stage 44 for the controlling the positioning of a copper mirror 46 secured thereto. At a lower position on the optical bench, there is mounted an adjustable X-Y-Z stage 48 to which there is affixed a meniscus lens 50.

A carbon dioxide laser 52 is located adjacent the optical bench 42 for directing a laser beam 54 onto the copper mirror 46. The optical bench is so positioned relative to the glass blank 10, the copper mirror 46, and meniscus lens 50 that the laser beam reflects off the mirror and down through the meniscus lens to impinge upon the upper end surface 12 of the glass blank. Because of the relatively small size of the glass blank, it is important that the X-Y and X-Y-Z stages are necessary in order to insure a impingement of the beam onto the glass blank end purpose for purposes of this invention.

A video camera 56 mounted on an optical bench 57 is directed toward the end 12 of the glass blank 10 in order to produce an image which can then be optionally displayed on a TV monitor 58 or stored in a video cassette via a VCR (not shown). In this manner, formation of the lens can be monitored throughout the method.

A microscope 60 is also provided conveniently adjacent (e.g., mounted on optical bench 42) and located so that the upper end of the glass blank can be directly viewed continuously during the production of the lens.

In practice of the method of the present invention, the glass blank 10 is placed within the holding fixture 22 as already described and the laser beam 54 is directed onto the end of the glass blank preferably onto the center point of the blank end face. Simultaneously, the air spindle is caused to rotate at a predetermined rate and is continued until the end of glass blank has been changed from a flat surface into a relatively continuously curved convex surface as shown in FIG. 2, for example.

In practical constructions of lenses according to the method of this invention, where the blank 10 is quartz or silica where the power output of the $CO_2$ laser was held in the range of 20-25 watts and the rotation speed at 1360 revolutions per minute, the lens formed was hemispherical. Where softer glass blanks were used (e.g., F2 or BK7) the laser power output was reduced to 5-10 watts and other parameters maintained the same. With a given set of method parameters, the resulting curvature of, say, a hemispherical lens can be maintained to within 5-15 microns.

Figure 6A:
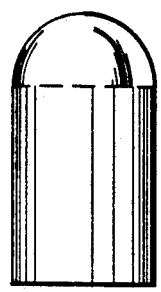
FIGS. 6A and 6B depict elevational views of lenses having spherical and aspherical surfaces, respectively, made by the method of this invention.
Figure 6B:
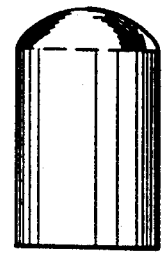

With rotation of the glass blank at approximately 1360 revolutions per minute during heating by the laser beam, the result is very close to a hemisphere being formed at the end of the blank (i.e., a circular curve) because of the glass surface tension. By varying the speed of rotation, the curve of the lens formed can be made aspheric as is shown in FIG. 6B, for example. Accordingly, where the parameters of glass blank size and material are fixed, the lens curvature obtained can be controlled solely by the length of time that the laser beam is directed onto the end face of the glass blank and the rate of rotation of the blank. In all cases, it is important that rotation be in a regular manner with little or no speeding up or slowing down which otherwise can produce an undesirable unsymmetrical curve for the lens.

Although as described the laser beam was preferably directed onto the center of the blank end face 12, satisfactory results have been obtained with off-center beam impingement.

This invention has been described in its presently contemplated best mode, and it is clear that In accordance with the practice of the method of the present invention, a glass rod of miniature dimensions (e.g., less than about 0.050 inches in diameter) can have an end portion formed into an aspheric or hemispheric lens unitary with the rod. More particularly the method for fabricating a lens includes rotating the rod while heating the rod end to the softening point. In this way, the glass softening is acted upon by both surface tension of the glass and centrifugal force from the rotation to achieve convex formation of the rod end. By varying the parameters of laser power and rotational speed, as well as the kind of glass composing the rod enables obtaining a lens shape of desired characteristics.

This invention has been described in its presently contemplated best mode, and it is clear that it is susceptible to numerous modifications, modes and embodiments within the ability of those skilled in the art and without the exercise of inventive faculties. Accordingly, the scope of this invention is defined by the scope of the following claims.

What is claimed is:

1. A method of forming the circular end face of a cylindrical glass or quartz blank into a lens, comprising the steps of:

rotating the blank at a uniform predetermined rate about the blank cylindrical axis normal to an end face of the blank at about 1360 revolutions per minute; and directing a laser beam of a power in the range of 15-20 watts substantially normally onto the blank end face while said blank is rotating.

2. A method as in claim 1, in which the blank is rotated at a uniform predetermined rate.

3. A method as in claim 1, in which the laser is directed substantially normally onto the center point of the blank circular end face.

4. A method of forming the circular end face of a glass or quartz cylindrical blank having a diameter in the range of 0.020-0.050 inches into a lens, comprising the steps of:

rotating the blank at a uniform rate about the blank cylindrical axis normal to an end face of the blank; and directing a laser beam substantially normally onto the blank end face center point while said blank is rotating.

5. A method of producing a convex lens on the end of and unitary with a cylindrical glass, quartz, or silica blank having a diameter of 0.020–0.050 inches, comprising the steps of:

facing off the end of the cylindrical blank into a flat circular surface precisely normal to the blank cylindrical axis;

locating the blank in a rotatable fixture with the faced-off blank upwardly directed and the axis of rotation coincides with the blank axis;

rotating the fixture and a blank at a constant uniform rate of about 136 revolutions per minute; and directing a laser beam in the power range of 15–20 watts normally onto the blank faced-off circular end surface until the glass softens to the extent that the combination of glass surface tension and centrifugal force forms the circular surface into a convex lens.

6. A method as in claim 5 in which the faced-off blank end surface is visually monitored throughout heating by the laser beam.

7. A method of producing a convex lens on the end of and unitary with a cylindrical glass blank, comprising the steps of:

facing off the end of the cylindrical blank into a flat circular surface precisely normal to the blank cylindrical axis;

locating the blank in a rotatable fixture with the faced-off blank upwardly directed and the axis of rotation coincides with the blank axis;

rotating the fixture and blank at a constant uniform rate; and directing a laser beam continuously normally onto the center point of the blank faced-off circular end surface until the glass softens to the extent that the combination of glass surface tension and centrifugal force forms the circular surface into a convex lens.

* * * * *